March 3, 1970 — C. L. BOWLING — 3,497,935
CUT-OFF TOOL ASSEMBLY
Filed Feb. 15, 1967 — 2 Sheets-Sheet 1
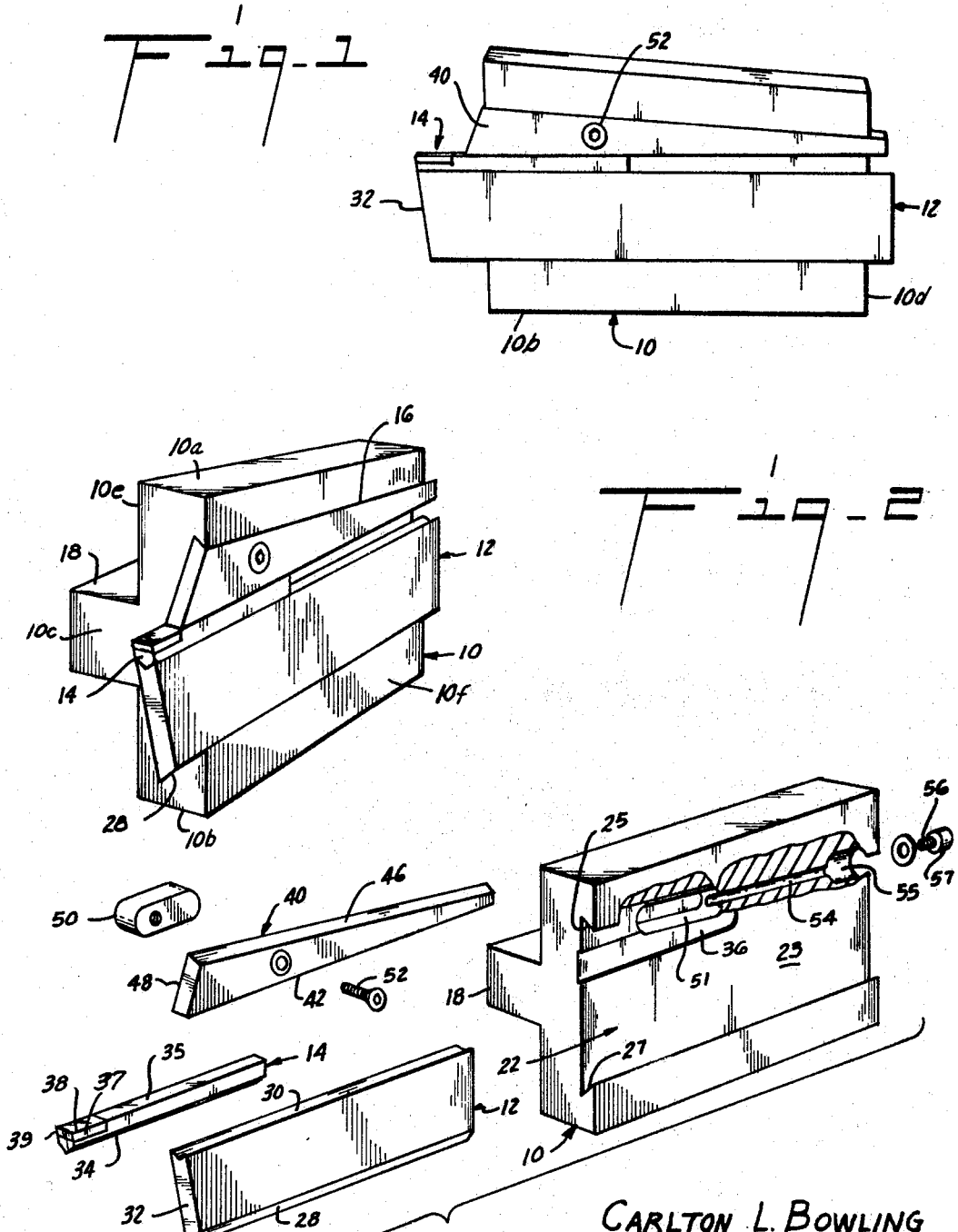
CARLTON L. BOWLING
INVENTOR.
BY
ATTORNEYS March 3, 1970 C. L. BOWLING 3,497,935
CUT-OFF TOOL ASSEMBLY
Filed Feb. 15, 1967 2 Sheets-Sheet 2
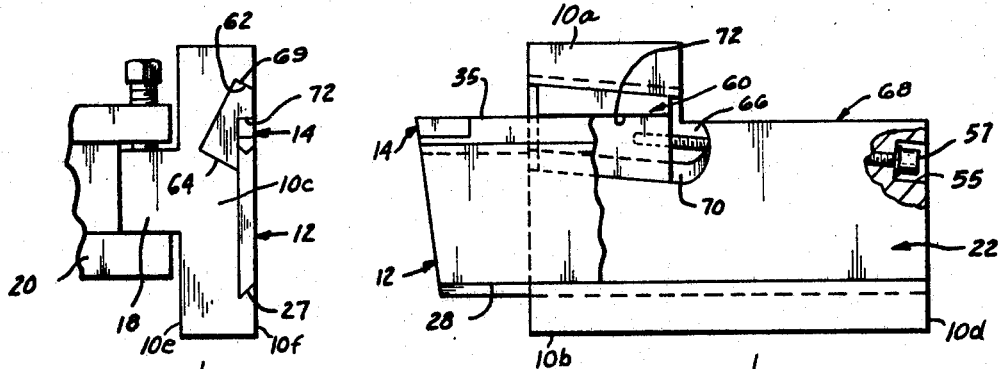
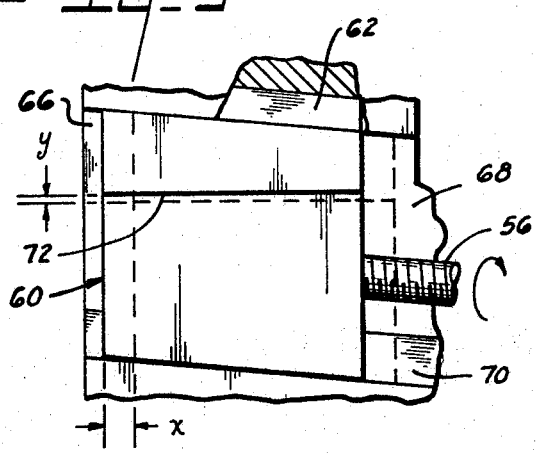
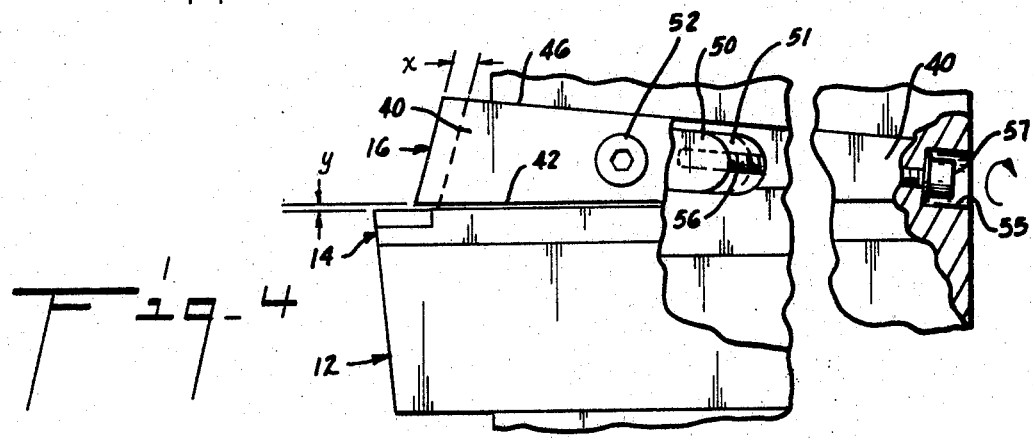
CARLTON L. BOWLING
INVENTOR.
BY
ATTORNEYS United States Patent Office 3,497,935
Patented Mar. 3, 1970

3,497,935
CUT-OFF TOOL ASSEMBLY
Carlton L. Bowling, Pearland, Tex., assignor to C. & L. Machine Shop, Inc., Houston, Tex., a corporation of Texas
Filed Feb. 15, 1967, Ser. No. 616,261
Int. Cl. B26d 1/00
U.S. Cl. 29—96                              6 Claims

ABSTRACT OF THE DISCLOSURE

A cut-off tool assembly formed of a tool holder having a tang by which the assembly may be secured to the tool post of a machine tool. A longitudinal dovetail groove extends along the side of the tool holder opposite the tang. The upper longitudinal wall of the groove is angularly inclined to the bottom wall. A support blade having an angular bottom edge mating with the angular bottom wall of the dovetail groove and a V-groove top wall is positioned along the bottom wall of the dovetail groove. A cutting bit having a V-shaped bottom wall is positioned on top of the support blade. A clamping member is positioned between the top of the insert cutting bit and the top wall of the groove and threaded means are provided which are threadedly engaged with the clamping member to draw the clamping member into engaging contact with the top wall of the groove and the insert bit and force the insert bit and support blade into engaging contact with one another and the support blade into engaging contact with the bottom wall of the groove, thereby securely retaining the insert cutting bit and support blade in the dovetail groove.

BACKGROUND OF THE INVENTION

This invention relates to cut-off tool assemblies and more particularly to a novel tool holder in which a support blade and a cutting bit are rigidly secured.

Although originally a thin-bladed cut-off tool was positioned in the standard tool post on the cross slide carriage of a lathe to perform grooving and parting operations on a rotating piece of stock, for some time various types of cut-off tool holders have been used. In such tool holders the thin cut-off tool blade has generally been replaced by a support blade and a separate cutting bit. The tool holders are so designed that the cutting bit may be expeditiously replaced. U.S. Patents 2,416,975 and 2,846,756 illustrate commercial cut-off tool holders of this type.

Although prior art cut-off tool holders are designed so that the cutting bit, which wears out through usage or hitting hard spots in the material, may be easily replaced and the horizontal plane of the cutting bit properly retained, it is difficult in some of the cut-off tool holders to replace the support blade. Although during normal usage the cutting bit is the only element which wears, in cases where there is an unknown hard spot in the rotating stock, the support blade may be damaged as well as the cutting bit. Therefore, it is desirable that the support blade may also be easily changed. Moreover, it is preferable that the assembly be so designed that the support blade may be redressed and reused. It is also desirable that the tool holder be designed and constructed so that the projection of cutting bit and support blade may be easily adjusted depending on the depth of groove or part-off.

It is also essential that a cut-off tool holder be so constructed that the cutting bit and the support blade are rigidly and solidly mounted at all times during the cut-off operation, so that all detrimental vibration or chatter is avoided.

It is the purpose of the present invention to provide an improved and a novel cut-off tool holder in which the support blade and the cutting bit are rigidly supported during the cutting operations, and which at the same time permits easy replacement of the cutting bit and support blade with positive positioning of the support blade and cutting bit so that the horizontal plane of the cutting edge of the cutting bit is maintained at the proper level, that the forward projection of the support blade and cutting insert may be easily adjusted to the cutting desired, and is so designed that the support blade may be redressed and reused.

SUMMARY OF THE INVENTION

The cut-off tool of the present invention is formed of a tool holder body provided with a tang by which the assembly may be securely mounted on a machine tool. A longitudinal dovetail groove extends along the side of the body opposite the tang. The top longitudinal wall of the groove is angularly inclined to the bottom longitudinal wall so that the walls converge toward the rear end of the body. A support blade is positioned in the dovetail groove along the bottom wall thereof. The bottom wall of the support blade is angularly inclined to the side walls thereof so as to mate with the angular bottom wall of the dovetail groove and a V-shaped groove extends along the top longitudinal wall. A cutting bit having a V-shaped bottom wall is positioned on top of the support blade. A generally triangularly shaped portion of a clamping member is interposed between the cutting bit and the top longitudinal wall of the groove. A passage in the body runs parallel with the angular top wall of the dovetail groove. A rod is rotatably mounted in the inclined passage and threadedly engaged with another portion of the clamping member and engaged with the body so that when rotated, it urges the first-mentioned clamping member portion into the throat of the dovetail groove thereby rigidly securing the cutting bit and the support blade in the dovetail groove.

With such construction, the cutting bit may be easily exchanged by loosening the rod attached to the clamping member portion and then driving the second clamping member forward which permits the cutting bit to be withdrawn. If the support blade has been damaged it may also be removed at the same time for redressing. The support blade will properly align the horizontal level of the cutting bit for immediate commencement of the cutting operation. Accordingly, it can be seen that the support blade and the insert cutting bit are easily replaceable and yet securely held in position in the dovetail groove by various tapers. Moreover, the cutting action instead of tending to loosen the support blade and cutting bit will cause the clamping action to become tighter; therefore, the support blade and cutting bit will remain rigidly in place during machine operation.

BRIEF DESCRIPTION OF THE DRAWINGS

FIG. 1 is an isometric view from the front of the novel cut-off tool holder of the present invention.

FIG. 2 is an isometric view from the side of the tool holder shown in FIG. 1.

FIG. 3 is an exploded view of the tool holder shown in FIGS. 1 and 2.

FIG. 4 is an enlarged plan view to show the clamping action of the tool holder.

FIG. 5 is a front elevational view of a tool holder having an alternative form of clamping.

FIG. 6 is a side view of the tool holder in FIG. 5 showing it positioned in a tool post of a machine tool.

FIG. 7 is an enlarged plan view illustrating the clamping action of the tool holder shown in FIGS. 5 and 6.

DESCRIPTION OF THE PREFERRED EMBODIMENT

Referring now to the drawings wherein like parts in the various views will be designated by the same reference character, it can be seen that the cut-off tool assembly of the present invention is generally comprised of a tool holder body 10 which is provided with means to mount the tool holder on a tool post of a machine tool, a cut-off blade which is divided into a support blade 12 and a cutting bit 14 and clamping means 16 which retain the cut-off blade on the body 10 of the cut-off tool holder.

The body 10 which has top and bottom walls 10a and 10b, respectively, front and rear ends 10c and 10d, respectively, and opposite sides 10e, and 10f, respectively is provided with a tang 18 on side 10e which may be secured in the tool post 20 of a machine tool, as can be seen in FIG. 5. The tang 18 may be in various forms in accordance with the requirements of mounting, as is well known in the art. The body 10 is provided with a longitudinally-extending dovetail groove 22 which extends along the side 10f of the body opposite the tang 18 and is angularly inclined with respect to the bottom longitudinal edge 26, thereby forming a tapering surface which converges toward the rear end of the body and is used in the clamping operation, as will be explained subsequently. The dovetail groove 22 has a vertical side wall 23 and angularly opposed top and bottom walls 25 and 27.

The support blade 12 is positioned in the dovetail groove 22. As can be seen, the support blade is generally rectangular in form. The bottom wall 28 is an angularly inclined surface so that it mates with the angularly inclined bottom wall 27 of the dovetail groove 22. The top wall 30 of the support blade 12 is in the form of a V-shaped groove, the purpose of which will be explained subsequently. The front end 32 of the support blade 12 may extend angularly to provide the proper relief, as is well known in the art. As can be seen, the support blade may be longer than the length of the tool body 10. If in the event the front end 32 of the support blade 12 becomes damaged it may be redressed and the remaining portion of the support blade utilized in the tool holder. Accordingly, the support blade will have a relatively long life, inasmuch as it can be reused after it has been damaged.

Positioned in the dovetail groove 22 on top of the support blade 12 is the cutting bit 14. As can be seen, the cutting bit 14 is generally rectangular or square in cross-section, with the bottom longitudinal wall 34 being V-shaped to mate with the V-shaped groove in the top longitudinal wall 30 of the support blade 12 and has a flat top wall 35. The side wall 23 of the dovetail groove 22 may be provided with a relief 36 opposite the location of the cutting bit 14 to permit a certain amount of latitude in the width of the cutting bit 14. The cutting bit is formed of material which is normally used for cutting inserts in the machine tool art. The cutting bit 14 may be provided with a pocket 37 in which is permanently secured an insert 38 of hard cutting material such as carbide, which provides the actual cutting operation. The front end 39 of the cutting bit 14 and carbide insert 38 are provided with the proper rake angle as is well known in the art. The support blade 12 and the cutting bit 14 are rigidly retained in the dovetail groove 22 by the novel clamping means 16 of the present invention.

The clamping means 16 is comprised of a clamping member having a substantially triangularly shaped portion 40 which is interposed between the cutting bit 14 and the angularly-inclined longitudinal top wall 25 of the dovetail groove 22. The clamping member portion 40 has a flat bottom wall 42 which, when the clamping member portion 40 is positioned in the dovetail groove 22, is parallel to the bottom wall 26 of the dovetail groove 22 and which is positioned against the flat top wall 35 of the cutting bit 14 and a top wall 46, which is angularly inclined to mate with the angularly inclined top wall 25 of the dovetail groove 22. Movement of the clamping member portion 40 horizontally toward the rear end of the tool body 10 causes the flat bottom wall 42 of the clamping member portion 40 to move vertically downward, see FIG. 4, where it can be seen that a horizontal movement X of the clamping member portion 40 toward the rear end of the tool body 10 results in a vertical downward movement Y of the bottom wall 42 of the clamping member 40. Such movement causes the clamping member portion 40 to exert pressure on the top wall 35 of the cutting bit 14 which is transmitted by the cutting bit 14 to the support blade 12 forcing the bottom wall 28 thereof into intimate contact with the bottom wall 25 of the dovetail groove 22. At the same time, the inclined wall 46 of the clamping member portion 40 is forced into intimate contact with the top wall 25 of the dovetail groove 22. Since the top and bottom walls 25 and 27 of the dovetail groove 22 are opposed angularly-inclined surfaces and the bottom edge 28 of the support blade 12 and inclined side 46 of the clamping member are angularly inclined to mate with the angularly-inclined top and bottom walls 25 and 27 of the dovetail groove 22, all the pieces will be rigidly retained in the dovetail groove 22. To provide additional support, the clamping member 40 may have an inclined front end 48 which will extend the effective length of the clamping member portion 40.

The above wedging-type of clamping action is particularly advantageous for cut-off tools since once the clamping member portion 40 is positioned, there is no tendency for it to become disengaged and, as the cut-off tool is fed into the work, either in a grooving or a cut-off operation, the cutting action on the tool will tend to force the cutting bit 14, the support blade 12 and clamping member portion 40 back further in the groove 22 tightening the clamping action and, therefore, maintaining the cutting bit 14 and the support blade 12 rigidly in the groove 22. It has been found in practice that no chatter results in the operation of the cut-off tool assembly herein described.

In order to actuate the clamping action, means are provided to move the clamping member portion 40 rearwardly into the throat of the dovetail groove 22. The clamping means 40 may be secured to another portion 50 thereof which is positioned in a pocket or cut-out portion 51 back of the vertical side wall 23 of the groove 22, see FIG. 3. The clamping member portion 40 may be secured to the portion 50 by a threaded member 52. Extending parallel with the inclined top 25 of the dovetail groove 22 is a passage 54 having a counterbore 55 at the rear end of the body 10. A rod 56 having an enlarged head 57 provided with an Allen head is positioned in the passage 54 with the head 57 in the counterbore 55. The front end of the rod 56 is threadedly engaged with the portion 50. By rotating the rod 56 the portions 50 and 40 the clamping member is drawn back into the throat of the groove 22 tightening the clamping member portion 40 tightly against the top wall of the groove and top wall 44 of the cutting bit 14 and forcing the angularly-inclined bottom wall 28 of the suppore blade against mating wall 27 of the groove, see FIG. 4. The drawing of the walls together acts as a locking wedge so that any action tending to force the cutting bit 14 and support blade 12 rearward in the tool holder will tighten the clamping action and more rigidly secure the cutting bit 14 and the support blade 12 in the dovetail groove 22. Accordingly, there will be no tendency for support blade 12 and the cutting bit 14 to become loose in the dovetail groove 22 due to the cutting action of the cut-off assembly.

If desired, the clamping member portions may be a unitary, one piece clamping member 60, see FIGS. 5 and 6, which not only engages the cutting bit 14 and top wall 25 of the dovetail groove 22, but also is threadedly engaged with the rod 56. In such case, the top wall 62 and bottom wall 64 of the clamping member 60 are parallel and are positioned in a pocket or cut-out portion 66 of a tool holder 68 with the top wall 69 of the cut-out portion 66 being incident with the top wall 23 of the dovetail groove. The bottom wall 70 of the cut-out portion 66 is parallel with the top wall 69, and thus with the bottom wall 64 of the clamping member. The action of the clamping member 60 is the same as the clamping action of clamping member of FIGS. 1 to 4, that is, clamping member 60 has the flat wall 72 which engages with the top wall 35 of the cutting bit 14 and inclined top wall 62 which engages with the angularly-inclined top wall 23 of the dovetail groove 22. Accordingly, as the clamping member 60 is moved back into the converging portion of the dovetail groove 22 a locking, wedging action takes place and the cutting bit 14 and the support blade 12 are rigidly held in the dovetail groove, see FIG. 7 where it can be seen that a rear horizontal movement X results in a vertical downward movement Y. Once the portion of the clamping member in the dovetail groove has been moved rearwardly into the converging portion of the dovetail groove 22, the rod 56 may be withdrawn and the clamping member portion will remain in position, retaining the cutting bit 14 and the support blade 12 rigidly in the dovetail groove 22. However, the rod serves a function in addition to the positioning of the clamping member portion, and that is, backing off the rod 56 and then striking it sharply will cause the clamping member portion to move forward in the dovetail groove, releasing the clamping action. It has been found that the cutting bit and support blade may be expeditiously replaced while the tool holder is positioned on a machine tool.

As can be seen from the foregoing, a cut-off tool assembly is provided in which the support blade 12 and the cutting bit 14 are rigidly secured in position during cutting operation and in which the cutting operation tends to tighten the securing of the cutting bit and support blade. Moreover, the support blade 12 as well as the cutting bit 14 can be readily changed and replaced. Further, the support blade 12, being a plain piece of machine steel, can be redressed and reused in the event that the front edge thereof is damaged during operation. The clamping means utilized in the cut-off tool holder is simple in operation and most efficient in retaining the cutting bit and support blade rigidly in position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A cut-off tool assembly for a machine tool, comprising a body having a top and bottom, front and rear ends, and opposite sides, said body also having a dovetail groove in one side thereof with top and bottom walls which converge from the front end of the body toward the rear end thereof, a support blade supported in the dovetail groove on the bottom wall thereof, the bottom of the support blade having a wall parallel to and engaging over the bottom wall of the dovetail groove and the top of the support blade having a V-shaped groove extending longitudinally thereof, an insert cutting bit supported in the dovetail groove on the top of the support blade, the bottom of the bit having a V-shaped wall parallel to and engaging the V-shaped groove in the top of the support blade, a clamping member having a generally triangular portion supported in the dovetail groove between the top of the bit and the top wall of the dovetail groove, the top of the clamping member having a wall parallel to and engaging the top wall of the dovetail groove, and means for moving the clamping member portion toward the rear end of the body to wedge said portion, said bit, and said support blade tightly between the top and bottom walls of the dovetail groove.

2. An assembly of the character defined in claim 1, wherein the assembly body has a pocket in the side wall of the groove, and said moving means comprises another clamping member portion slidably received in the pocket for movement in a direction parallel to the top wall of the groove, and a rod threadedly connected to the slidable portion of the clamping member and engaged with the body, said rod having a part adapted to be rotated for so moving the clamping member.

3. An assembly of the character defined in claim 2, wherein said pocket opens to the front end of the body and has a bottom wall parallel to the top wall of the dovetail groove and a side wall perpendicular to the top wall of the groove and bottom wall of the pocket, and said slidable portion of the clamping member has a side wall parallel to and slidable over the side wall of the pocket and a bottom wall parallel to and slidable over the bottom wall of the pocket.

4. An assembly of the character defined in claim 3, wherein said portions of the clamping member are made of one piece.

5. An assembly of the character defined in claim 2, wherein said pocket has upper and lower parallel walls, and said slidable portion of the clamping member has top and bottom walls parallel to and slidable over the top and bottom walls of the pocket.

6. An assembly of the character defined in claim 5, wherein the pocket has a front wall spaced rearwardly from the front end of the assembly body, and the portions of the clamping member are releasably connected to one another.

References Cited

UNITED STATES PATENTS

| | | | |
|---|---|---|---|
| 2,210,605 | 8/1940 | Speckert | 29—96 |
| 2,377,519 | 6/1945 | Rich | 29—96 |
| 2,390,653 | 12/1945 | Kilgore | 29—96 |
| 2,398,913 | 4/1946 | Anthony et al. | 29—96 |
| 2,416,975 | 3/1947 | Anthony | 29—96 |
| 2,453,959 | 11/1948 | Anthony et al. | 29—96 |
| 2,846,756 | 8/1958 | Novkov | 29—96 |

HARRISON L. HINSON, Primary Examiner